United States Patent Office.

PATRICK S. DEVLAN, OF JERSEY CITY, NEW JERSEY.

Letters Patent No. 102,922, dated May 10, 1870; antedated May 4, 1870.

---

IMPROVED COMPOSITION FOR COATING WOOD, METAL, &c.

The Schedule referred to in these Letters Patent and making part of the same.

---

*To all whom it may concern:*

Be it known that I, PATRICK S. DEVLAN, of Jersey City, in the county of Hudson and State of New Jersey, have invented a new and useful Improvement in Fiberola or Composition for Coating Wood, Metal, &c.; and I do hereby declare that the following is a full, clear, and exact description thereof, which will enable others skilled in the art to make and use the same.

My invention has for its object to furnish an improved composition for coating wood, metal, &c., in manufacturing various kinds of useful articles, which shall be light, strong, durable, susceptible of taking a high polish, and which may be made elastic, if desired; and It consists of the composition formed of the ingredients, in about the proportions, and in the manner herein described.

In preparing this composition, I take boiled linseed-oil, and gradually mix with it ground litharge and burned umber in about the proportion of two pounds of litharge and one-quarter of a pound of umber to one gallon of oil.

This mixture I boil to a varnish, adding about one quart of any quick-drying hard varnish. I then put into the mixture as much of any suitable fibrous material as will absorb nearly all the oil, and heat the mixture sufficiently to drive off any moisture that may be in the fibrous material.

I then mix with the mixture an equal quantity by weight of the following compound, or as much of it as will make the composition of about the consistency of putty.

Silica, thirty parts; oxide of iron, fifty parts; alumina, seven parts; magnesia, five parts, and lime, eight parts.

These ingredients are ground to a fine powder, and are thoroughly mixed with the previously prepared mixture until the fibrous material is perfectly and evenly incorporated with the other ingredients.

When it is desired to make the composition partially elastic, I dissolve in the oil, by heat, one pound of gutta-percha, or mix with it about one-half a pound of caoutchouc, dissolved in naphtha or other proper solvent.

The composition may be colored, as desired, according to the purpose for which it is to be used, by mixing with it any coloring matter.

Having thus described my invention,

I claim as new and desire to secure by Letters Patent—

An improved composition for coating wood, metal, &c., formed of the ingredients and in about the proportions and manner herein set forth and described.

The above specification of my invention signed by me this 12th day of October, 1869.

P. S. DEVLAN.

Witnesses:
GEORGE W. MABEE,
JAMES T. GRAHAM.